(12) United States Patent
Thomas et al.

(10) Patent No.: US 12,179,861 B1
(45) Date of Patent: *Dec. 31, 2024

(54) ELECTRIC PORTAL WHEEL HUB SYSTEM

(71) Applicants: Robert P Thomas, Phoenix, AZ (US); Jordan Thomas, Centennial, CO (US)

(72) Inventors: Robert P Thomas, Phoenix, AZ (US); Jordan Thomas, Centennial, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/219,882

(22) Filed: Jul. 10, 2023

Related U.S. Application Data

(63) Continuation-in-part of application No. 16/701,123, filed on Dec. 2, 2019, now Pat. No. 11,697,340.

(Continued)

(51) Int. Cl.
*B62D 59/04* (2006.01)
*B60G 9/00* (2006.01)
*B60G 11/27* (2006.01)
*B60K 1/02* (2006.01)
*B60K 7/00* (2006.01)
*B60K 17/04* (2006.01)

(Continued)

(52) U.S. Cl.
CPC ............... *B62D 59/04* (2013.01); *B60K 1/02* (2013.01); *B60K 7/0007* (2013.01); *B60K 17/043* (2013.01); *B60L 1/003* (2013.01); *B60L 50/60* (2019.02); *B60R 16/0231* (2013.01); *H02K 7/116* (2013.01); *B60G 9/00* (2013.01); *B60G 11/27* (2013.01); *B60G 2300/042* (2013.01); *B60L 2200/28* (2013.01); *B60L 2210/10* (2013.01); *B60L 2220/14* (2013.01); *B60P 3/20* (2013.01)

(58) Field of Classification Search
CPC .......... B60K 7/0007; B60K 6/26; B60K 6/36; B60K 17/043; B60B 27/0021; B60G 7/008; B60G 2206/124; B60L 7/10; B60Y 2200/91; B60Y 2200/92; B60Y 2400/607; B62D 7/00
See application file for complete search history.

(56) References Cited

U.S. PATENT DOCUMENTS

| | | | |
|---|---|---|---|
| 8,323,143 B2 | 12/2012 | Schoon | |
| 11,697,340 B1 * | 7/2023 | Thomas | B60K 17/046 |
| | | | 180/13 |

(Continued)

*Primary Examiner* — Drew J Brown
(74) *Attorney, Agent, or Firm* — Invention To Patent Services; Alex Hobson

(57) ABSTRACT

An electrical portal wheel hub system is coupled with a wheel of a vehicle and utilizes an electric motor/generator configured to drive the wheel or generate power through application of braking torque to the wheel, and may be coupled with two or more wheels of the vehicle, wherein generated power is provided to a portal hub battery. The portal hub battery may provide power to the electric motors, or to other electrical devices or batteries of the vehicle. The vehicle may include a trailer or non-driven wheels having a connecting axle and an electrical portal hub may be coupled to these otherwise, non-driven wheels. The vehicle may be an electric vehicle and the electrical portal wheel hub system may provide power to a vehicle battery that provides power to drive the wheels of the vehicle. A controller may control power from the portal hub battery to the electric motor/generators and or other battery and devices to provide energy efficiency.

20 Claims, 14 Drawing Sheets

Related U.S. Application Data

(60) Provisional application No. 63/464,630, filed on May 8, 2023, provisional application No. 63/451,950, filed on Mar. 14, 2023, provisional application No. 62/774,073, filed on Nov. 30, 2018.

(51) Int. Cl.
  *B60L 1/00* (2006.01)
  *B60L 50/60* (2019.01)
  *B60P 3/20* (2006.01)
  *B60R 16/023* (2006.01)
  *H02K 7/116* (2006.01)

(56) References Cited

U.S. PATENT DOCUMENTS

| | | | |
|---|---|---|---|
| 2003/0010551 A1 | 1/2003 | Shirazawa | |
| 2006/0012144 A1* | 1/2006 | Kunzler | B60G 3/01 |
| | | | 280/124.125 |
| 2014/0000970 A1* | 1/2014 | Munster | B60K 1/00 |
| | | | 475/149 |
| 2014/0125205 A1 | 5/2014 | Landfors et al. | |
| 2014/0300175 A1 | 9/2014 | Takahashi | |
| 2018/0015986 A1 | 1/2018 | Tanaka | |
| 2018/0056767 A1 | 3/2018 | Dolgov et al. | |

\* cited by examiner

ELECTRIC PORTAL WHEEL HUB SYSTEM

CROSS REFERENCE TO RELATED APPLICATION

This application is a continuation in part of U.S. patent application Ser. No. 16/701,123, filed on Dec. 2, 2019 and currently pending, which claims the benefit of priority to U.S. provisional patent application No. 62/774,073, filed on Nov. 30, 2018 and this patent application claims the benefit of priority to U.S. provisional patent application No. 63/451,950, filed on Mar. 14, 2023 and U.S. provisional patent application No. 63/464,630 filed on May 8, 2023; the entirety of each of these applications is incorporated by reference herein.

BACKGROUND OF THE INVENTION

Field of the Invention

The invention relates to an electric portal wheel hub system where the mechanical geared portal hub is configured within the sliding axle system of a trailer and the geared hub is connected to the axle on each end of the axle that is attached to the different types of suspension that is attached to the trailer frame rails.

Background

The off-road industry including the desert racing, rock crawling and four-wheel drive racing is always looking for ways to improve travel of suspension, clearance and overall performance. In addition, many enthusiasts as well as race teams are looking for way to increase acceleration.

The electric portal wheel hub system we found is ideal for spinning the high rpm motors close to their highest power curves. This relates to more power every time the motor/generator engages. When you have two of these motors in use, there may excess power that may be re-directed to another battery storage.

SUMMARY OF THE INVENTION

The invention is directed to an electric portal wheel hub system. An exemplary electric portal wheel hub system comprises an electrical portal wheel hub casing configured proximal to a wheel and an electric motor therein. The electric motor may be coupled directly to a wheel or may be coupled through one or more gears. In an exemplary embodiment, the electric motor is coupled with an input gear that drives an output gear that in turn drives a stub axle. In this preferred embodiment, the electric motor or rotational axis of the electric motor, as measured on the electric motor, can be vertically offset from the rotational axis of the wheel by a vertical offset distance, thereby providing more ground clearance. This increased ground clearance may be beneficial for off-road vehicles. The electric motors may be the primary or sole power source for driving the wheels or may be a supplemental power source, wherein the wheel is driven by a secondary power source, such as an internal combustion engine. An exemplary electric portal wheel hub system may be configured to provide auxiliary power and torque to the wheel to provide faster acceleration. A drive axle from the vehicle may extend and couple with the electric motor such as by a yoke. The drive axle may have a rotational axis that is aligned with or the same as the rotational axis of the electric motor. The drive axle may extend at an angle from the electric motor to the wheel.

An electric portal wheel hub system may be configured on each wheel of a vehicle or only a portion of the wheels, such as on the front and/or back wheels of a four-wheeled vehicle. In an exemplary embodiment, the back wheels may be powered by a secondary power source and the front wheels may be configured with an electric portal wheel hub system. An exemplary electric portal wheel hub system may be configured on a real trailing arm and an upper pivot A-arm or pivot arm may be coupled with the hub casing.

An electric portal wheel hub system is coupled with an electrical power supply, such as a battery. A battery as used herein may include a plurality of batteries configured in parallel or series. In an exemplary embodiment, an electric motor acts as a generator, such as when the electric motor is engaged to provide a braking torque to the wheel or when not required for providing torque to the wheel. The electric motor may provide a recharging supply of electricity to the battery to recharge the battery. A control system may engage the electric motor to act as a generator as required to maintain a state of charge of the battery. In an exemplary embodiment, the electric motor/generators are powered by an on-board battery. Each electric motor controller that controls the electric motor/generator, such as an axial flux permanent magnet (PM) traction motor/generator, may change the torque output of the motor or change the motor from a motor providing torque to a wheel to a generator, producing power by applying a braking torque to the wheel. The controller may be coupled with a Controller Area Network (CAN Bus) that takes direction from a central processing unit (CPU) such as an electronic control unit (ECU) and delivers power from the battery to the electric motor, such as an axial flux permanent magnet (PM) traction motor/generator.

The invention is directed to an electric portal wheel hub system. An exemplary electric portal wheel hub system comprises an electrical portal wheel hub casing configured proximal to a wheel and an electric motor therein or coupled with the input gear through a drive axle or half shaft. An exemplary hub casing comprises an inner and an outer casing to enable access to the components therein. The main function of the portal hub casing is to enclose and support the components therein such as the electric motor, gears, bearings, axles and the like. It may be important to prevent dirt and debris from causing damage and creating wear in these parts. The hub casing may be designed for many types of gearing applications and designs that work in concert with the axial flux "pancake" type motor/generator to achieve different performance values. A distinct feature of this hub system is the ability to change the gearing or type of gearing all within the same cavity design while using the same electric motor. An exemplary electric portal wheel hub may be extremely light in weight thereby optimizing the weight to power ratio of the vehicle. A half shaft or drive axle may extend through the hub casing to connect with the input gear.

As battery technology and electric motor technology is advancing and improving, these technologies can be adapted and designed into better and higher performance parts and systems to improve performance, torque and speed. Many aspects of the old technologies and the new technologies can be brought together in developed hybrids combining horse power from older types of power plants and new electrical motor integrations working together in new designs and performance capabilities. This new independent drive system works with high horsepower off-road race cars and trucks to Utility Terrain Vehicles (UTV's).

An exemplary electric motor is a synchronous motor or Permanent Magnet (PM) synchronous topology motor such as an axial flux motor which can be made with a very flat aspect ratio of width to diameter. An exemplary low-profile axial flux motor is a pancake axial flux motor, having an aspect ratio of width to diameter of no more than 1 and preferably less than 0.75, and even more preferably less than 05. An exemplary permanent magnet motor may be an axial flux motor/generator. An exemplary motor is a transverse flux motor which has "ring" shaped windings that couple each stator core to the entire armature ampere-turns. This unique configuration can produce high torque at low RPM's. High torque is achieved by increasing the pole number with no sacrifice of electric loading. An exemplary motor is a synchronous motor with a motor controller. A synchronous electric motor is an AC motor in which, at steady state, the rotation of the shaft is synchronized with the frequency of the supply current; the rotation period is exactly equal to an integral number of AC cycles.

An electric portal wheel hub when used as a single direct drive hub can change the handling characteristics on all four corners of the vehicle. In an off-road application, the two front wheels can work as an all-electric drive system while the rear two wheels are powered by the combustion motor. Another application would be to have all four hubs, front and rear, to be all electric portal hubs and another application would be to have the front two hubs all electric only and the back to be driven by axles connected to the yokes and added power on demand through the rear hybrid electric drive portal hub system. An exemplary electric portal wheel hub may be configured on the front, back or all four wheels of a four-wheeled vehicle and the front and/or back may also receive power from a supplemental power source, such as an internal combustion engine. An exemplary electric portal wheel hub may be configured on the front and or back wheel of a two wheeled vehicle.

The portal wheel hub design allows for the hub casing to suspend the outer loads of the vehicle weight. Certain placement of the electric motor inside the casings and certain milling of the casings will allow for a more stable placement of the gears and the motor to work in harmony and with the weight of the vehicle off loaded, and with the bearings that hold the splines and axles fabricated inside the hub casings, this allows the horizontal torque loads to be balanced and not to damage the gears and splines and to prevent external pressures from causing damage to the electric motor.

Direct drive wheel motors eliminate mechanical transmission losses allowing up to 85% of a vehicle's kinetic energy to be recoverable during braking. When using wheel motors for propulsion and braking, such as the electric motor/generator of an electric portal hub as described herein, an impressive feature is that of safety and vehicle dynamics features including antilock braking systems (ABS), stability control, traction control, brake steer, active brake bias, torque vectoring, intelligent cruise control, emergency brake assist and collision avoidance. These features all become customizable and upgradable through software. When these systems are combined with wheel motors, they allow a new level of performance based active yaw control and dynamic fine-tuning understeer and oversteer to enhance cornering speed and safety. Other vehicles may have an active yaw control, but are only activate in an emergency situation.

An exemplary drive axle of the vehicle couples with the electric motor at a vertical offset distance from the rotational axis of the wheel. This provides more clearance for the drive axle which is beneficial especially for off-road vehicle. An exemplary vertical offset distance may be about 25 mm or more, about 50 mm or more, about 75 mm or more, about 100 mm or more, about 150 mm or more, about 200 mm and any range between and including the vertical offset distances provided. The electric motor may be offset a vertical offset distance from the rotational axis of the wheel and the drive axle, a half shaft, may extend from the wheel at an angle from horizontal to the electric motor.

An electric portal wheel hub system is coupled with an electrical power supply, such as a battery. In an exemplary embodiment, an electric motor acts as a generator, such as when the electric motor is engaged to provide a braking torque to the wheel or when not required for providing torque to the wheel. The electric motor may provide a recharging supply of electricity to the battery to recharge the battery. A control system may engage the electric motor to act as a generator as required to maintain a state of charge of the battery. In an exemplary embodiment, the electric motor/generators are powered by an on-board battery. Each electric motor controller that controls the motor/generator, such as an axial flux permanent magnet (PM) traction motor/generator. The controller may be coupled with a CAN Bus that takes direction from an ECU and delivers power from the battery to the electric motor/generator, such as a Permanent Magnet (PM) synchronous topology motor including, but not limited to, an axial flux permanent magnet (PM) traction motor/generator.

Additionally, each motor/generator through the controller, Battery Management System, may take direction from the electronic control unit (ECU) by a Protocol Data Unit, PDU coupled with a power distribution unit (PDU). This system is also viable to most types of electric axles that have a two motor system. When the electric portal hubs are connected by an axle with an electric portal hub on each side, there are now two electric generators. The electric portal hubs may generate more power than is needed for the on-board battery, and this power may be distributed to another battery, such as a vehicle battery or secondary battery or to an electrical device, such as a refrigeration unit.

When power is distributed from the hub battery to a secondary electrical device, it may go through a DC/DC converter or DC/DC/DC converter to reduce voltage from a high voltage to a low or lower voltage. Power produced by the electric motors of the electric portal hub when acting as a generator my go to the hub battery, to the power distribution unit and then to a secondary battery or other electrical device or directly to a secondary battery or an electrical device. Using DC/DC converters allows the better system matching, and faster charging systems. If the electric portal hub system generates high voltage, such as 800 VDC, this may be much too high for electrical devices on the track or trailer or vehicle. Some electrical devices may only require 24V, and a DC/DC converter may be used to convert the high voltage from the battery to low voltage A vehicle configured with an electric portal hub system, as described herein, may be an electric vehicle that utilizes battery power to propel the vehicle and the vehicle may have a vehicle battery that is separate from the hub battery, the battery coupled with the electric motors of the electric portal hubs to power the electric motors and/or receive power from the electric motors. The electric portal hub system may charge a vehicle battery either directly from the electric motors through the power distribution unit, or from the hub battery. The electric portal hub system may produce high voltage and the hub battery may be at a high voltage. High voltage, as used herein is about 50V DC or more, about 100V DC or more, about 250V DC or more, about 500V DC or more, or about 750V DC or more or any range between and including the values provided. Low voltage, as used herein, is voltage below 50V.

A vehicle of the present invention maybe a two wheeled vehicle, and the wheels may be aligned such as with a motorcycle or may be configured on opposing sides of the vehicle, such with a three wheeled or four or more wheeled vehicle. A vehicle may be a car with four wheels, two on each side of the vehicle. The electric portal hub may be configured on wheels on opposing sides of the vehicle to provide traction control and other benefits.

An electric portal hub may be coupled to a wheel by a trailing arm, wherein the connecting axle of the wheels of the vehicle or trailer are coupled with the connecting axle. A slider axle system may also be utilized to allow movement with respect to the frame of the vehicle or trailer. A slider axle carriage may be coupled with the frame and the trailing arm may be coupled to the slider axle carriage. The electric motor may also be coupled with the slider axle carriage. A suspension component such as an air bag, or load spring may be configured to dampen the movement of the trailing arm. A shock may also be coupled with the trailing arm and extend to the slider axle carriage to dampen movement of the trailing arm.

The summary of the invention is provided as a general introduction to some of the embodiments of the invention and is not intended to be limiting. Additional example embodiments including variations and alternative configurations of the invention are provided herein. With the electric motor and the gear ratios designed to make the most of the electric motor while using the kinetic energy, and the motor/generator in this type of development

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Definitions: An electric motor as used herein refers to an electrical device that can operate as an electric motor to provide torque output and that in some embodiments, can also act as a generator to produce electrical power from a torque input. The term motor/generator is used synonymously with electric motor herein.

Figure 1:
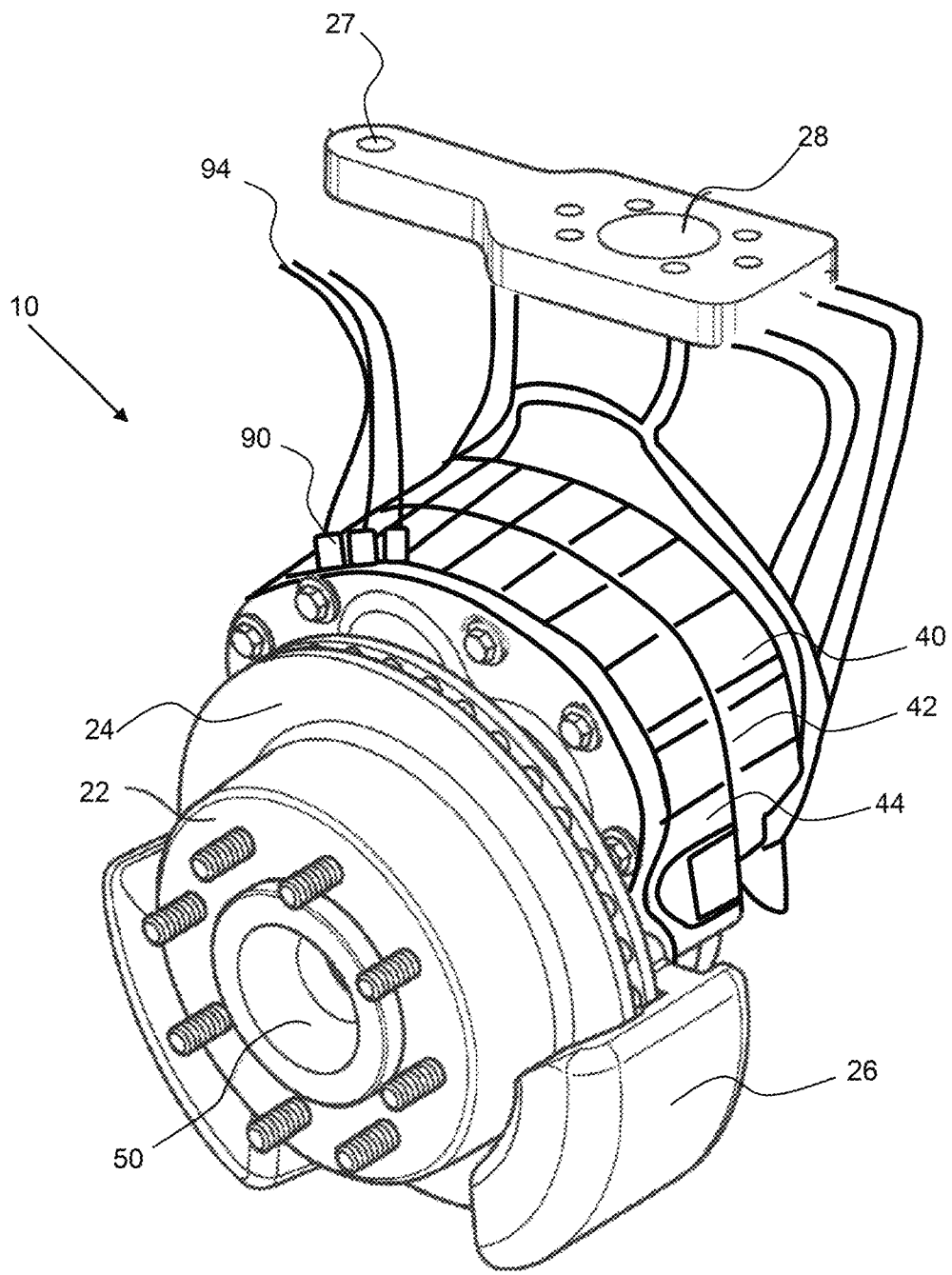
FIG. 1 shows a wheel side view of an exemplary electric portal wheel hub together with the axle stub, disc brake rotor and brake caliper attached to the portal casing.

As shown in FIG. 1, an exemplary electric portal wheel hub 10 comprises an electric motor configured within the hub housing 40 that drives the stub axle 50 and therefore a wheel attached to the wheel mount 22. The drive axle of the vehicle couples with the electric motor at a vertical offset distance from the rotational axis of the wheel. This provides more clearance for the drive axle which is beneficial especially for off-road vehicle. Also shown is the disc brake rotor 24 and brake caliper 26 attached to the hub. The exemplary electric portal wheel hub comprises an inner hub casing 42 and an outer hub casing 44. A steering arm mount 27 and an upper A-arm connector mount 28 are coupled with the hub casing 40. An electric motor, such as an axial flux motor is configured inside of the hub and power wires 94 of a wiring system 90 extend into the hub casing to provide power to the electric motor.

Figure 2:
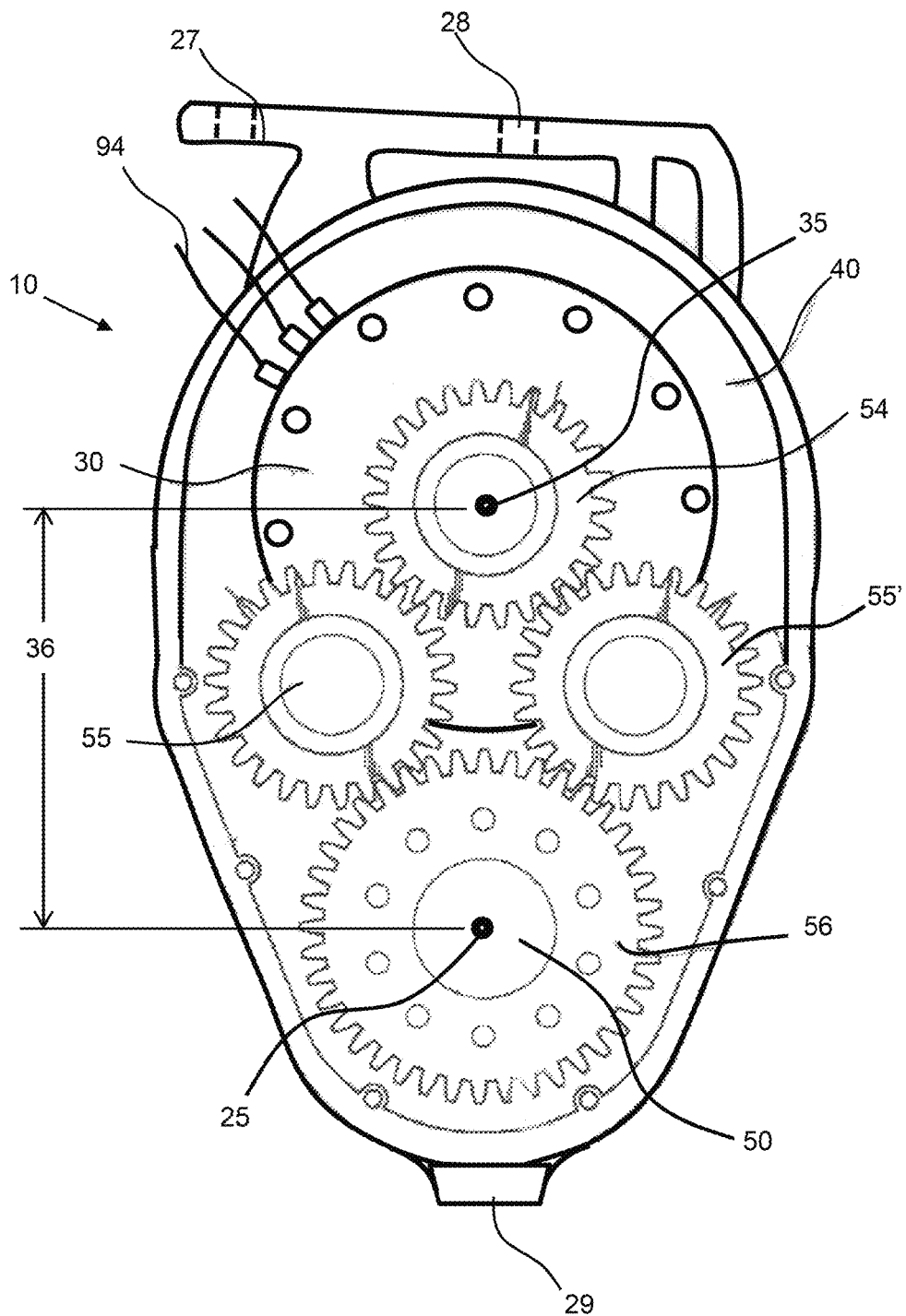
FIG. 2 shows a portal hub casing with an electric motor, an axial flux motor/generator configured inside.

As shown in FIG. 2 an exemplary electric portal wheel hub 10 comprises an electric motor 30 coupled with an input gear 54, a plurality of idler gears 55, 55' and an output gear 56, that is coupled with a spline 52 and ultimately to a stub axle 56 to provide torque and spin wheel. A hub casing 40 is designed around the electric motor and the gearing layout. The lower A-Arm connection mount 29 and upper A-Arm connection mount 28 are shown along with a steering arm 27 connection mount 27. This type of design may be well suited for high torque applications. The gears may be interchangeable to change the torque output for a particular application. The input gear is driven by an electric motor, such as an Axial Flux Motor/Generator 32, or axial flux electric motor, and a drive axle coupled with a yoke. The input gear may be powered by the electric motor when additional torque and acceleration are desired and the electric motor may spin in idle when not required or may act as a generator to charge a rechargeable battery as required. This combination of power sources, an electric motor and a secondary power source that drive the vehicle axle provides a lot of versatility. An electric motor, such as an axial flux motor is configured inside of the hub and power wires 94 extend into the hub casing to provide power to the electric motor. The electric motor may be a three-phase motor. As shown in FIG. 2, the electric motor has a rotational axis 35 that is offset a vertical offset distance 36 from the rotational axis of the wheel 25. This offset distance enables more clearance for the wheel and makes this type of electric portal hub well suited for off-road vehicles.

Figure 3:
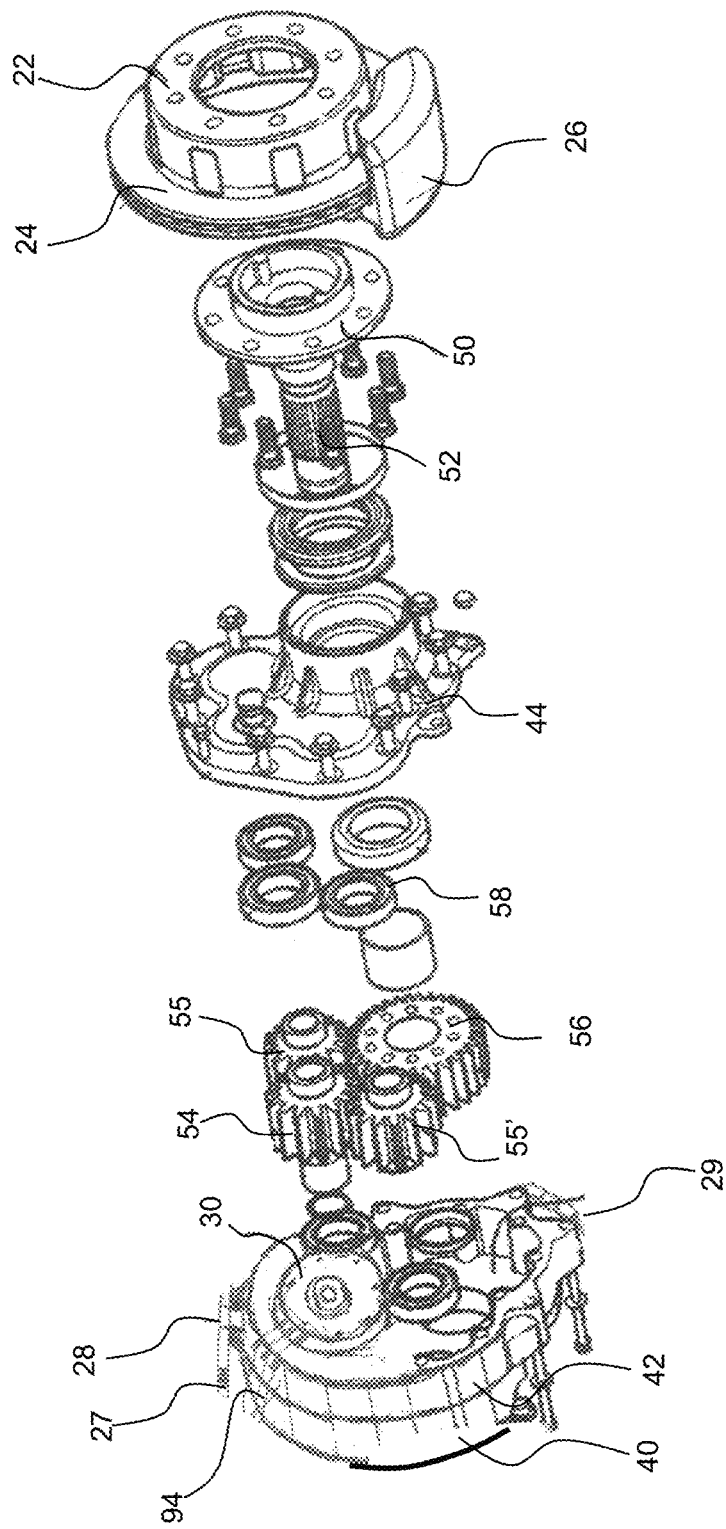
FIG. 3 shows an exploded view of an exemplary electric portal wheel hub assembly.
Figure 4:
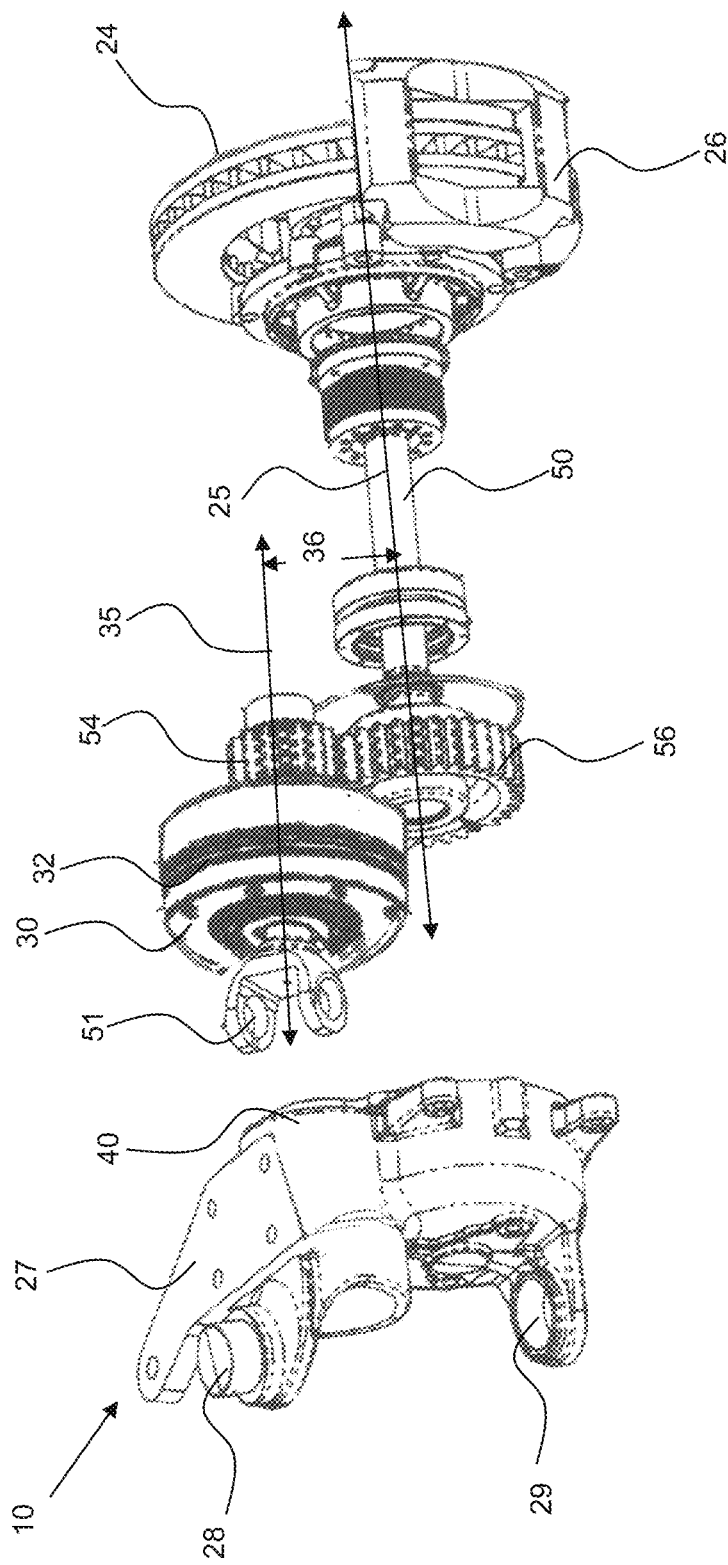
FIG. 4 shows an exploded view of an exemplary electric portal wheel hub assembly.

Referring now to FIGS. 3 and 4 an exemplary electric portal wheel hub 10 comprises an electric motor 30 having a rotational axis 35 that is configured at a vertical offset distance 36 from the wheel rotational axis 25, or the center of the wheel mount 22. The electric motor is configured in a hub casing that may comprise an inner hub casing 42 and an outer hub casing 44. The electric motor is coupled with the input gear 54 to provide torque to the input gear. The input gear drives the output gear directly or indirectly through an arrangement of other gears. As shown in FIG. 3, a pair of idler gears 55, 55' are configured in the gearing arrangement. The bearings 58 for the gears are shown in FIG. 3. The bearings and gears are retained in the hub casing 40. The output gear drives the stub axle 50 which drives the wheel. The wheel is coupled with a brake 24 rotor and a brake caliper 26 is coupled to the brake rotor in a conventional manner. The electric motor may provide a braking resistance to the rotation of the wheel and this braking resistance may act to generate electricity, wherein the electric motor acts as a generator to provide power to electrical devices and/or to charge a rechargeable battery. The outer hub casing 44 comprises another bearing location for the bearings for the stub axle 50 which couples with the output gear 56.

As shown in FIG. 4, an exemplary electric portal wheel hub 10 is configured for medium to high torque and is a high RPM design. In this embodiment, the electric motor 30 may be a pancake type electric motor, such as a pancake axial flux motor 32 that is well suited for fitting into the inner hub casing 42. The rotational axis of the electric motor 35 is offset vertically from the rotational axis of the wheel 25. A drive axle from the vehicle is configured to couple with the yoke 51 which is aligned to have the same rotational axis as the electric motor. A shaft may extend through the electric motor or separate connections may be provided on either side of the motor. A through shaft, through the motor may be a more durable arrangement however. The electric motor is coupled to the input gear 54 and the input gear drives the output gear 56. Again, the output gear is coupled with and drives the stub axle which is engaged with the rotor to drive the wheel. The upper A-arm connection mount 28 and the lower A-arm connection mount 29 are shown coupled to the hub casing 40. The steering arm connection mount 27 is also coupled with the hub casing.

Figure 5:
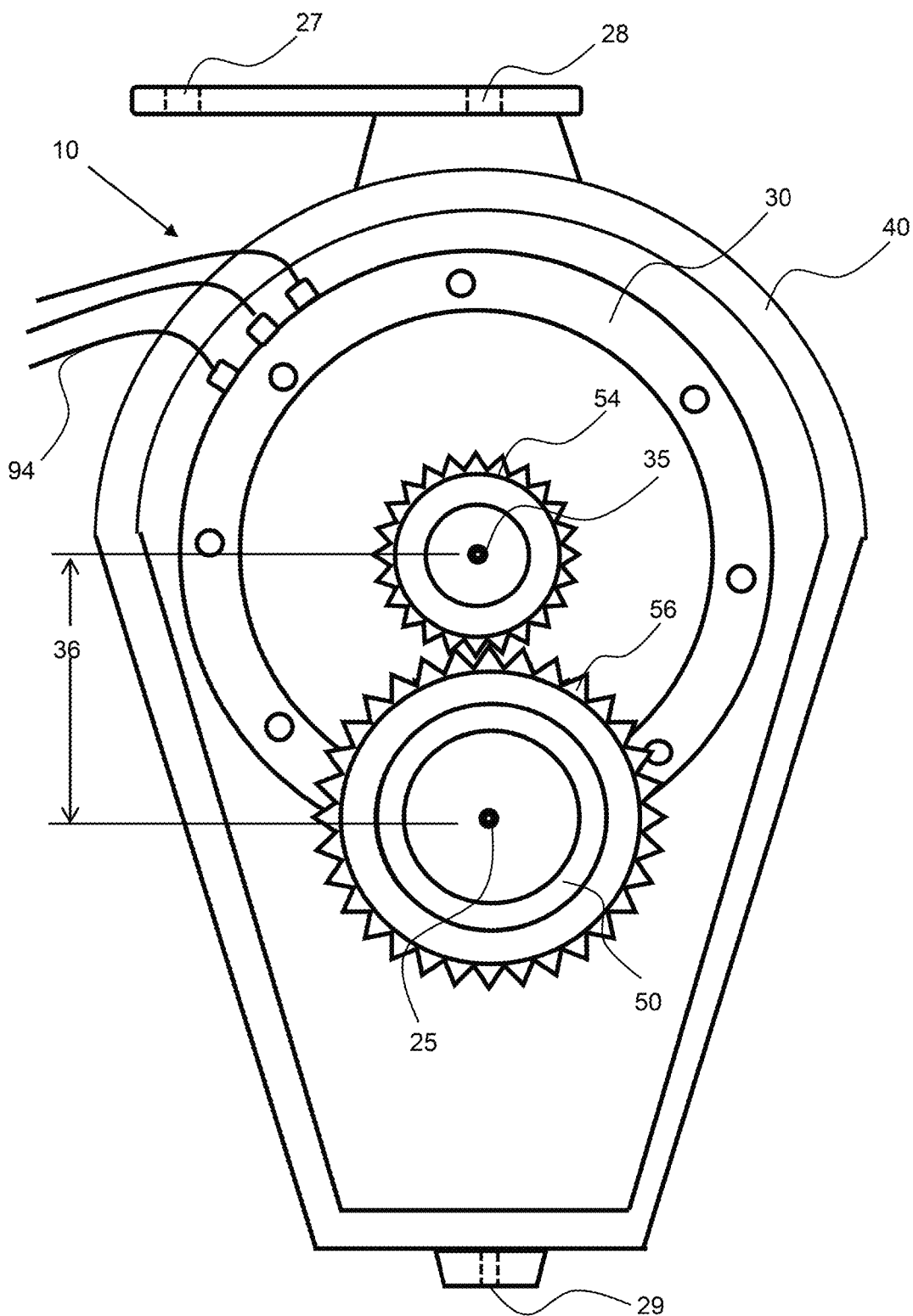
FIG. 5 shows an exemplary hub casing that is designed around the electric motor and an exemplary gearing configuration.

As shown in FIG. 5, an exemplary electric portal hub 10 is configured for a medium to high torque and RPM output. The inner hub casing 42 is configured to retain the electric motor 30 and electrical wires 94 extend into the hub to provide power to the motor or to receive power from the motor when operated as a generator. The electric motor is coupled with an input gear 54 that rotates about the rotational axis 35 of the electric motor. In this embodiment, the input gear is coupled directly with the output gear 56. The output gear may be coupled with a stub axle 50 that drives a wheel. Both the input and output gears may be changed to provide a desired gear ratio. The vertical offset distance 36 between the rotational axis of the electric motor 35 and the rotational axis of the wheel 25 provides additional ground clearance.

Figure 6:
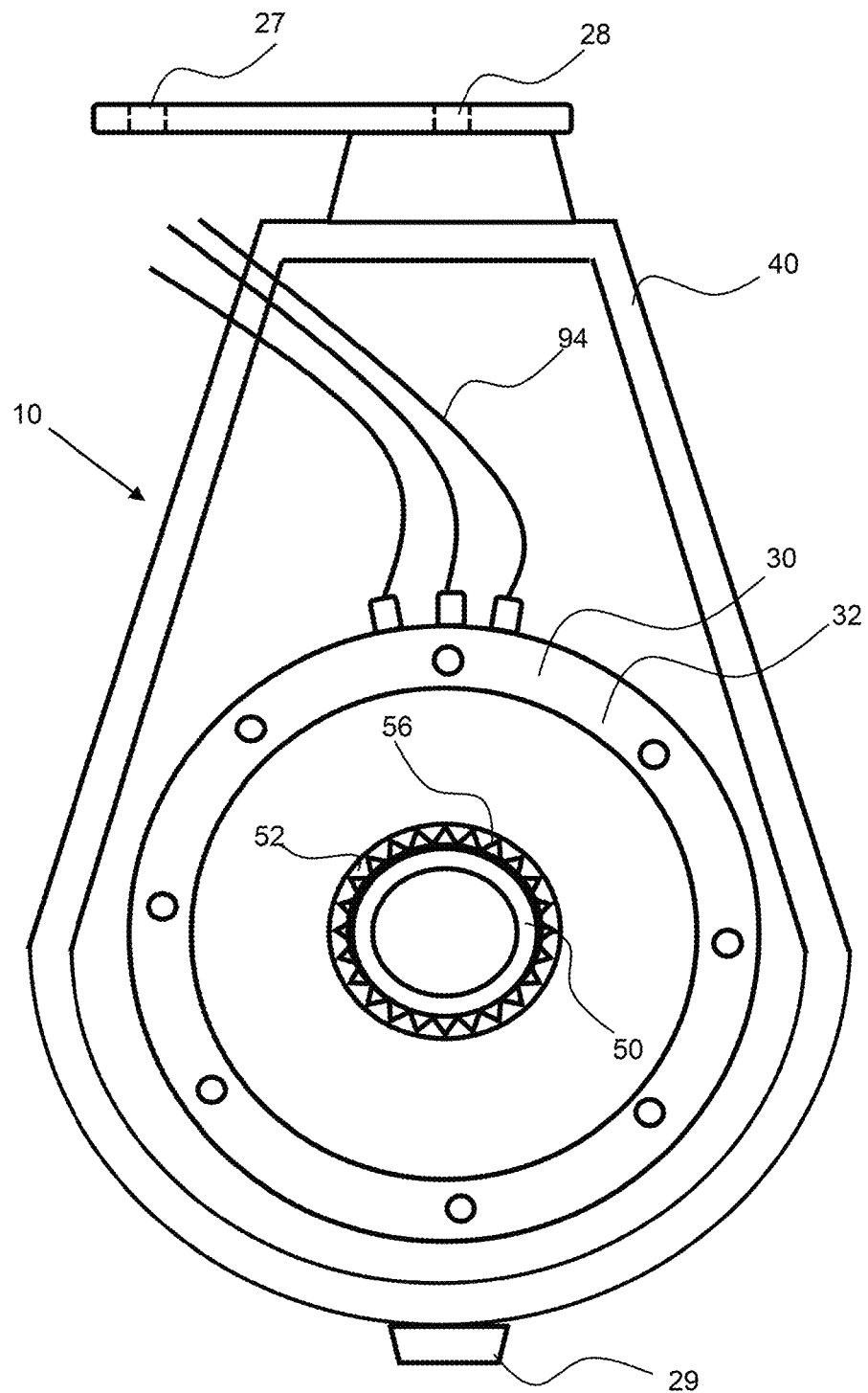
FIG. 6 shows an exemplary hub casing that is designed around the electric motor and an exemplary gearing configuration.

As shown in FIG. 6, an exemplary electric portal hub 10 is configured in a hub casing 40 with an axial flux motor/generator 32 secured inside. The Axial flux motor has an open spline 52 for the stub axle 50 to be coupled thereto. In this embodiment, the electric motor is a direct drive design and may be suitable for low torque applications.

Figure 7:
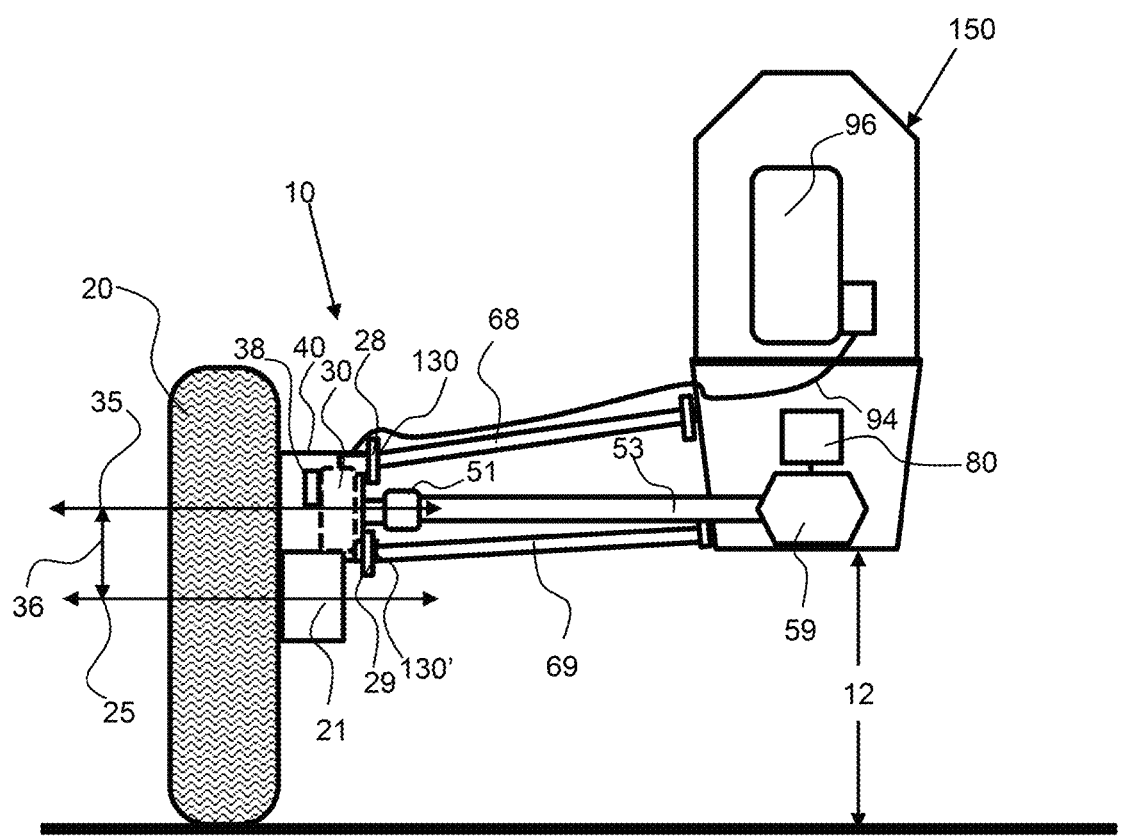
FIG. 7 shows an exemplary electric portal wheel hub coupled to a wheel and with a drive axle of a vehicle.

As shown in FIG. 7, an exemplary electric portal hub comprises an electric motor 30 to provide power and torque to a wheel 20. This power and torque may be supplemental power and torque to a secondary drive or secondary power source 80, such as a combustion engine, that drives a wheel axle 21. As shown, the rotational axis of the electric motor 35 and drive axle 53 are offset vertically from the rotational axis of the wheel 25, or wheel axle, to provide additional clearance from the ground. The vertical offset distance 36 between the rotational axis of the electric motor 35 and the rotational axis of the wheel 25 provides additional ground clearance 12 between the ground and the differential 59, as shown. A drive axle may extend out horizontally from the differential and therefore the ground clearance may be greater between the drive axle and the ground as well. This travel gain may be particularly important in off-road vehicles. The drive axle may extend from a differential 59 and be coupled with a yoke. The upper A-arm 68 is coupled with the upper A-arm connection mount 28 on the hub casing 40 and the lower A-arm 69 is coupled with the lower A-arm connection mount 29 on hub casing. The electrical motor 30 is coupled with a battery 96 and wires 94 extend from battery, through the hub casing 40 and to the electric motor. A vehicle 150 may be configured the hub or the hub casing that is coupled to upper and lower A-arms may be coupled to the hub or hub casing by a pivot arms 130, 130'. A motor controller 38 is shown in FIG. 7.

Figure 8:
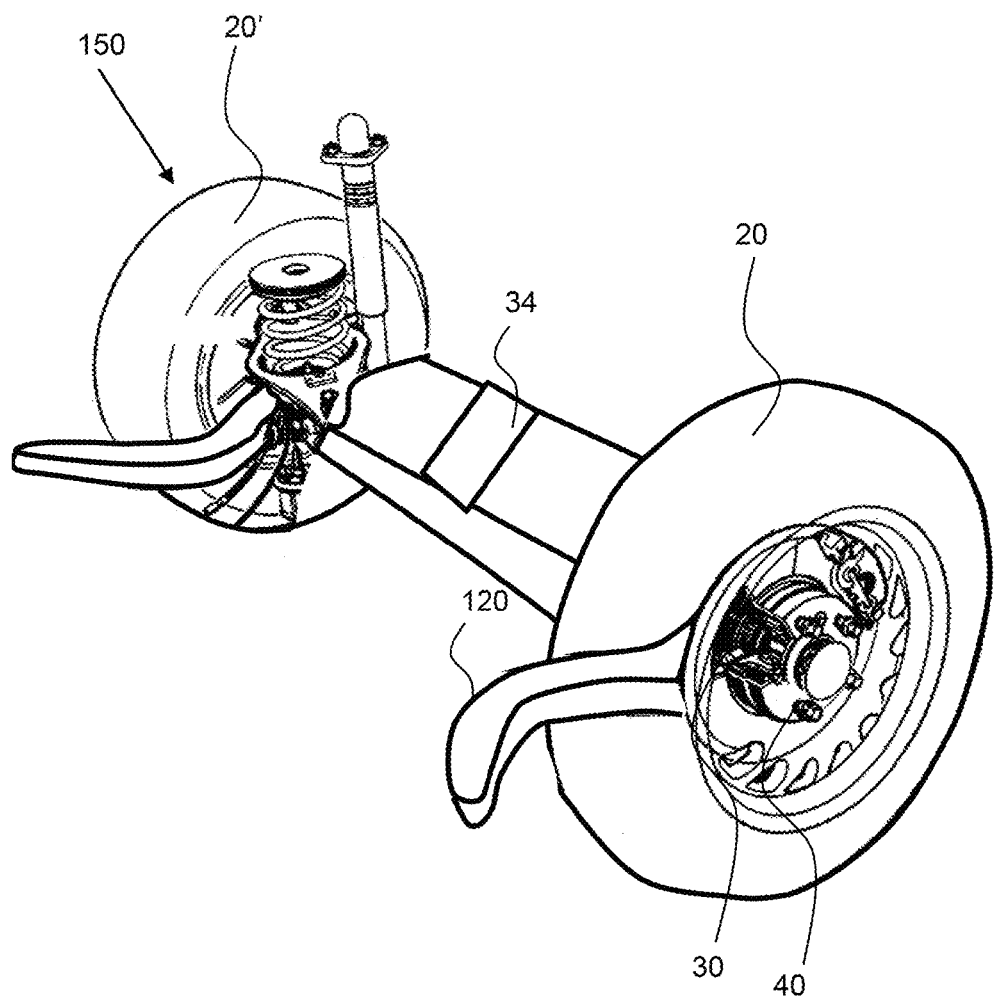
FIG. 8 shows a perspective view of rear wheel of a vehicle having a hub coupled to trailing arms.

As shown in FIG. 8, a vehicle 150 may comprise trailing arms 120 such and the hub 41 or hub casing 40 may be coupled to the trailing arm. A straight axle 34 extends between the two wheels.

Referring now to FIGS. 5 and 9 to 12, the trailer 606 of the tractor-trailer 602 has an electrical portal wheel hub system 607 comprising an electrical portal hub 207, 207' coupled to the wheels on opposing sides of the trailer. The electric motor 205, (motor/generator) for each of the electric portal hubs may be coupled to the wheels via an input gear 54 coupled with a drive axle 53, or half shaft 240, driven by the electric motor. A half shaft is a type of drive axle as used herein and may couple a wheel with an electric motor of the electric portal hub and be driven, such as by the electric motor of the electric portal hub. The electric motor may be configured on one end of the drive axle or half shaft and the input gear may be configured on the other end of the drive axle or half shaft, for example. The electric portal hub 207 may be coupled to the connecting axle 206 of a vehicle 600, such as a trailer 606 of a tractor-trailer 602, and the connecting axle may not be driven by axle, other than the electric motor of the electric portal hub system. The electric motors may act as generators when applying a braking torque to the wheels coupled to the connecting axle and the electrical power generated may be stored in the hub battery 210, or the vehicle battery 225, a battery that is used by the vehicle or tractor to provide propulsion of the vehicle and/or power other electrical devices of the vehicle, including a refrigeration unit 620. A battery management system 211 may monitor battery states of charge and provide input to the electronic control unit 214. A control system 601 includes an electronic control unit 214 that provides instructions to the power distribution unit, having a plurality of electrical switches 299, to distribute power for efficient and effective operation of the vehicle. The electronic control unit may control the electric motors 205 to operate as generators when power is needed, or may control the electric motors to provide torque to the wheels on the connecting axle 206 to propel the vehicle, such as during take-off from a stop or when going up a hill. The additional torque may greatly reduce fuel consumption of the vehicle.

Figure 9:
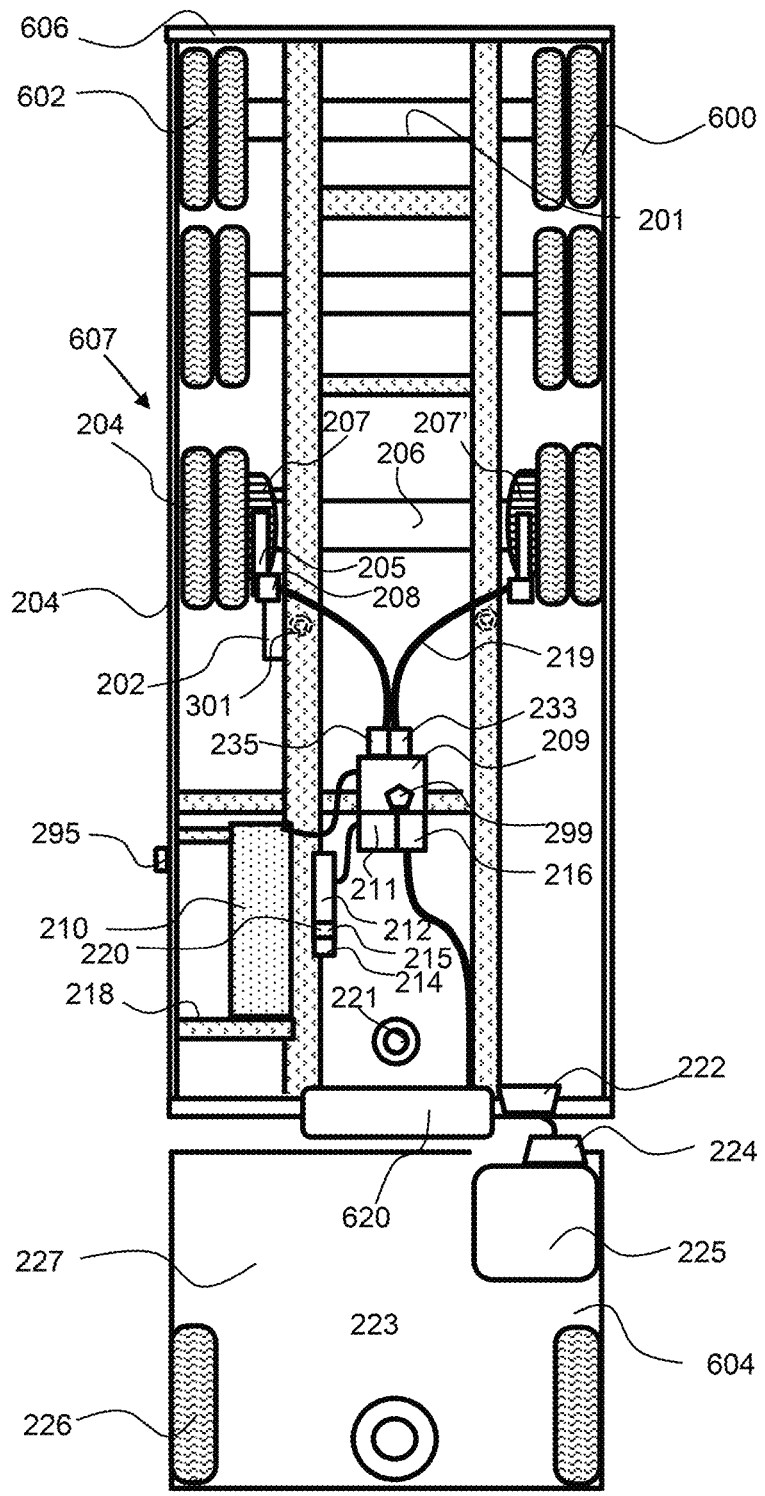
FIG. 9 shows top view of a tractor-trailer configured with an electric portal hub system with an electric portal hub coupled to wheels on either side of a connecting axle and a power distribution unit that distributes power to and from these electric motors as controlled by the electronic control unit.

Referring now to FIG. 9, a vehicle 600, such as a tractor-trailer 602, having a tractor 604 and a trailer 606, incorporates an electrical portal wheel hub system 607 having two electric portal hubs 207 coupled with an electric motor 205, or electrical machine, and is configured on each side of the trailer 606 and connected with a connecting axle 206, which may be a drive axle 53. The trailers of tractor-trailers typically have a connecting axle 206 that extends across the trailer from a first side to a second side to connect the wheels on opposing sides. A hub casing may be configured to couple with the connecting axle and a drive axle or half shaft, may extend and couple with the connecting axle as generally shown in FIG. 7. The connecting axle is connected to trailing arm 202 that have a suspension component 301 as described in FIG. 13 and FIG. 14. The connecting axle 206 is a third axle from the back of the trailer 606 and the trailer has two dual axles 201, 201' which are more proximal to the back of the trailer, each with two wheels 204 on each side.

The tractor 604 may be an electric tractor 227, being powered by a battery that drives the front wheels 226. The tractor front wheels may be powered, at least in part, by power from the hub battery 210 that may be configured on the trailer 606 via a tractor plug 224 coupled with high voltage lines 223 coming from the power distribution unit 209 and coupled with the trailer plug 224. The power distribution unit has a plurality of electrical switches 299 configured to direct electrical power or electrical current between the portal hub battery, the electric motors of the electrical portal hub, a vehicle battery 225, a secondary electrical device 621, such as a refrigeration unit 620 and the like. The power may be configured to flow to and from these components to provide effective and efficient operation of the vehicle and/or to reduce fuel consumption. As shown on the front of the trailer, a trailer plug 222 is configured to enable connection to shore power or to couple the trailer electrically with the tractor, wherein power from the electric portal hub system may be distributed to the tractor including, but not limited to, the vehicle battery 225, to electric motors to drive the front wheels 226 of the tractor, electrical devices and the like. Low voltage communication lines 220 from the CAN Bus 215 and electronic control unit (ECU) 214 may communicate to the power distribution unit 209 to direct power as required to the wheels on the trailer and/or the wheels on the tractor. The power distribution unit 209 communicates via the electronic control unit (ECU) 214, an example of a controller, with the battery management system 211, and the vehicle battery 225 with set points. The power from the kinetic energy can go to the hub battery 210 or the vehicle battery 225, such as a tractor battery, or both. The DC/DC converter 212 may send power to a secondary electrical device 621, such as the electric transport refrigeration unit 620, small sensors 216, and even liftgates. The hub battery 210 may be configured to charge a vehicle battery 225. The tractor may be coupled to the trailer by a hitch 221.

which may be configured in the tractor 604 of the tractor-trailer 602. The hub battery 210 is configured to be charged by the electric motors of the electrical portal hub when they are acting as generators and providing a braking torque to the respective wheels. The hub battery may provide power to drive the vehicle in total, wherein the vehicle has only one battery, the hub battery. In this case, the vehicle may have a charging port 295 to further charge the hub battery.

The motor controller 208 is controlled by the electronic control unit 214 and may drive the electric motor 205, such as an axial flux motor, for propulsion of the tractor-trailer 602 or on demand or the kinetic energy may be sensor 216 activated or set point activated or both. The electronic control unit will send hub battery 210 power to all power systems and even to the vehicle battery 225.

Figure 10:
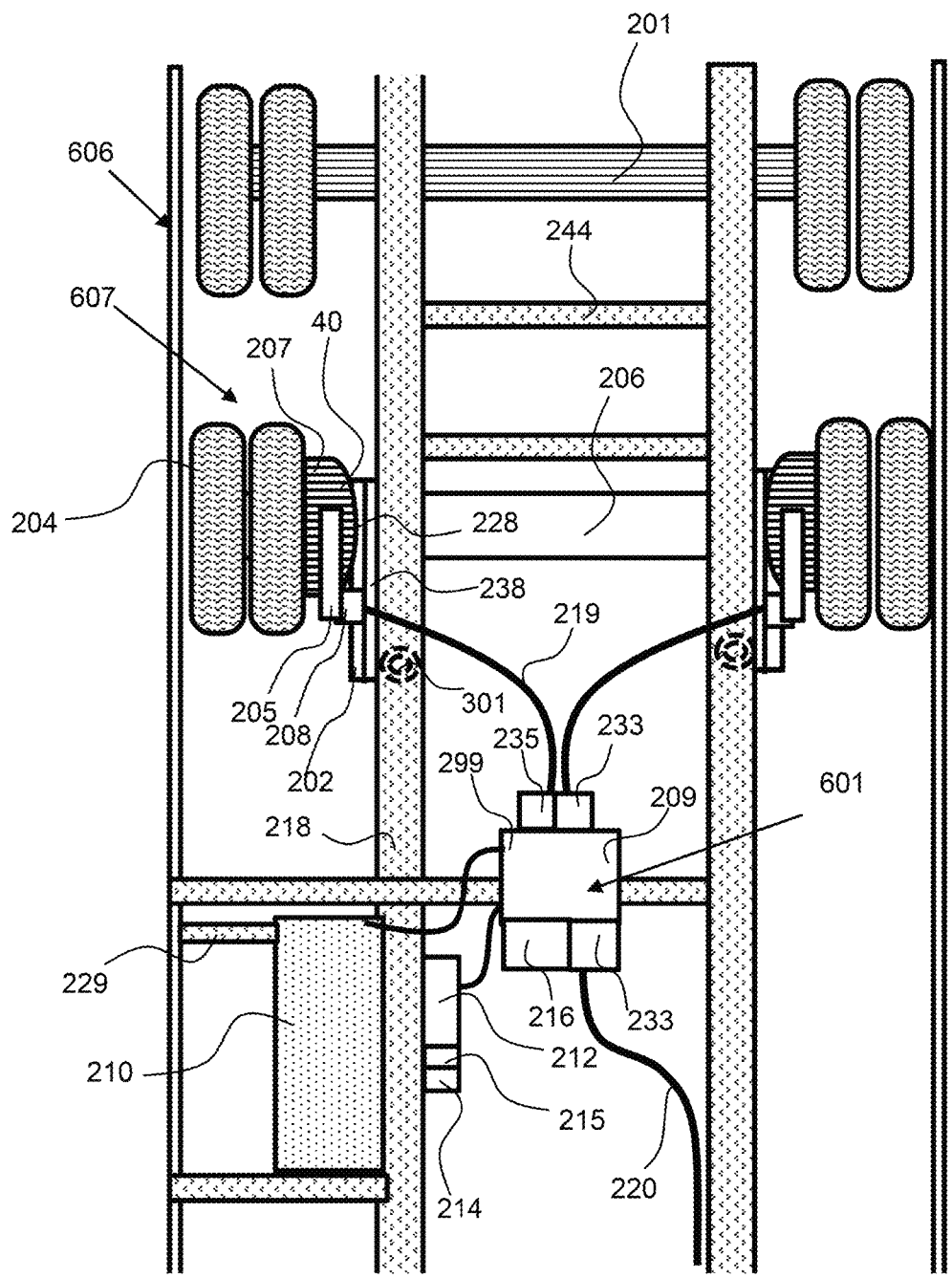
FIG. 10 shows an expanded view of electric portal hubs configured on wheels on either side of the connecting axle and the control system.

As shown in FIG. 10 an exemplary electric portal hub 207 is coupled with an electric motor 205 and the backside of the electric portal hub is coupled to the connecting axle 206 by a connecting flange 228. The connecting axle 206 is coupled to the trailing arm 202 and a suspension component 301 is configured between the trailing arm and the frame 218 of the trailer 606. Also shown is a standard dual wheel axle 201 of the trailer 606. The electric portal hub 207 is connected by wires 219 to the motor controller 208 and the power distribution unit 209 with AC/DC 235 and DC/DC charging converters 233 that enables low multiple types of charging with shore power. The CAN 215 allows for communications within the system and ECU 214 to precisely control the power distribution through the power distribution unit 209.

Power will be distributed to either the hub battery 210, which may be coupled to the frame 218, such as to the strut 229 and may be electrically coupled with other batteries or to other lower voltage components though the DC/DC converter.

Figure 11:
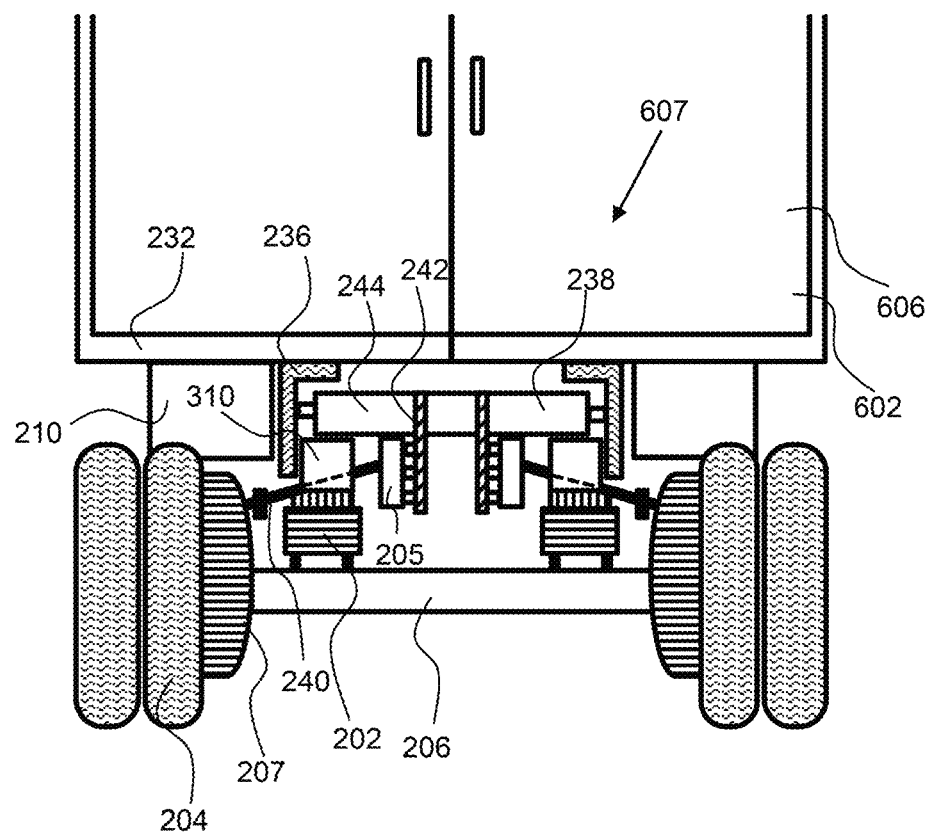
FIG. 11 shows a rear view of the sliding axle system, the box frame that slides within the frame rails and how the electric motor of the electric portal hub system is mounted within the frame and a drive shaft extending from the electric motor to the input gear of the electric portal hub.
Figure 13:
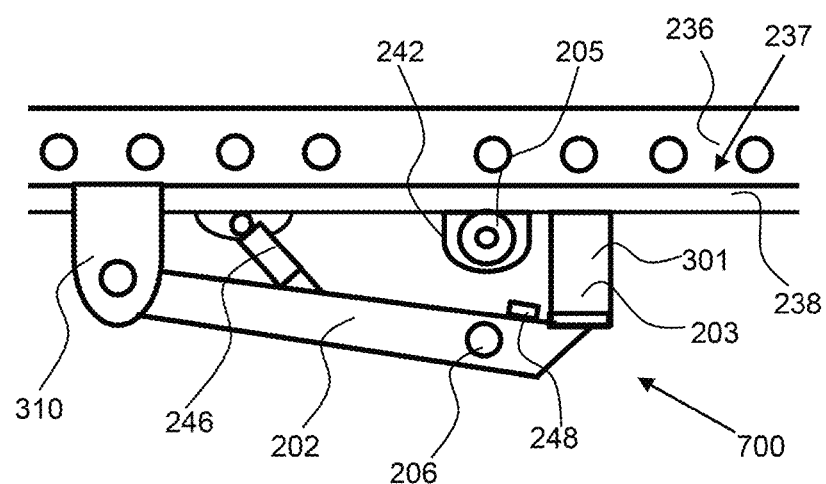
FIG. 13 shows a side view of an exemplary sliding axle system with a slider axle carriage coupled to the frame of the trailer and having the electric motor of the electric portal hub and trailing arm attached thereto, wherein the connecting axle is attached to the trailing arm. A shock and suspension component, air bag suspension, are configured to apply a force to the trailing arm to dampen vibration during travel.
Figure 14:
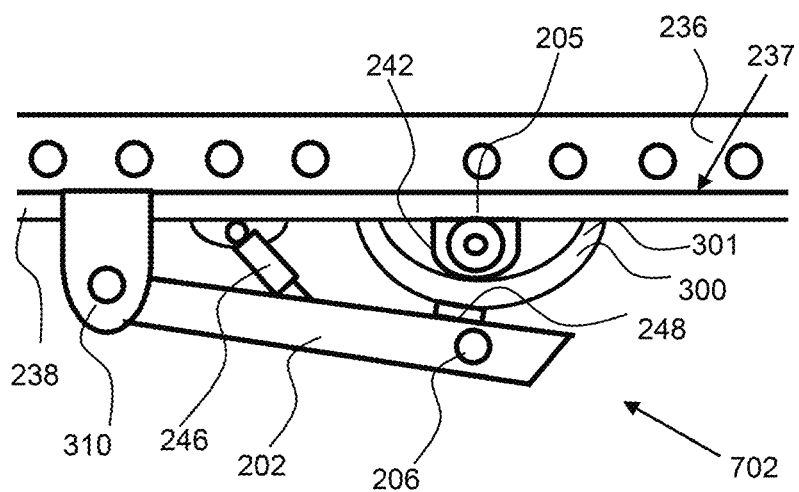
FIG. 14 shows a side view of an exemplary sliding axle system with a slider axle carriage coupled to the frame of the trailer and having the electric motor of the electric portal hub and trailing arm attached thereto, wherein the connecting axle is attached to the trailing arm. A shock and suspension component, load spring, are configured to apply a force to the trailing arm to dampen vibration during travel Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As shown in FIG. 11, a tractor-trailer 602 has a container box floor 232 that sits on the frame 236 that is designed to have a slider carriage frame 238 slide forward or to the rear depending on the cargo load within the trailer 606. The slider carriage frame 238 is designed to have a suspension, that may include a trailing arm 202, wherein the trailing arm bracket 310 (as best shown in FIGS. 13 and 14) connects to the main axle 206 and at each end of the axle is the electric portal hub 207 and the wheels 201. The input gear of the electric portal hub 207 is attached to a drive axle, such as a half shaft 240 that is attached to the electric motor 205. The electric motor/generator 205 is coupled to the metal flange that is attached to the upper carriage frame 244. Also shown is the hub battery 210 coupled to the slider carriage frame 238.

Figure 12:
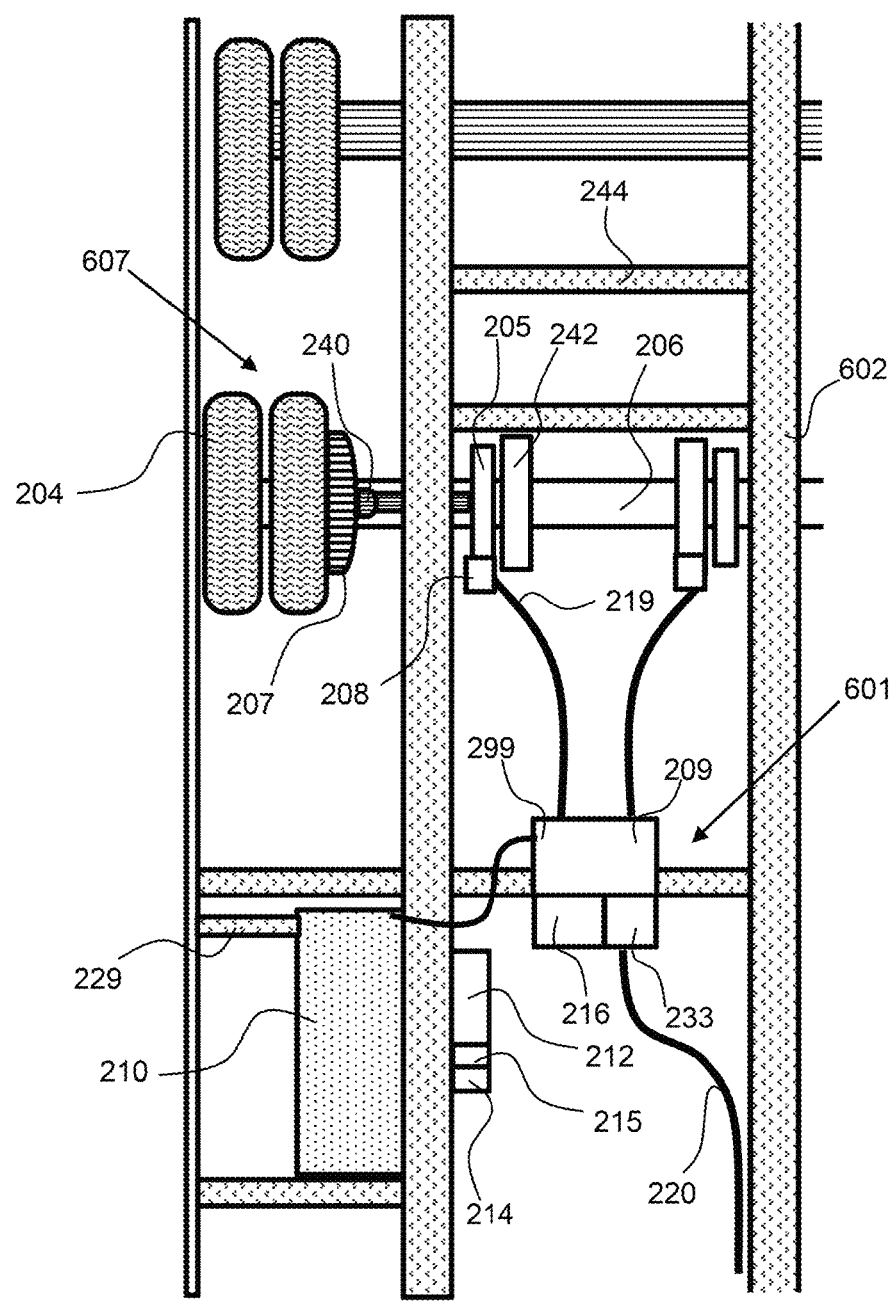
FIG. 12 shows a top-down view of the slide geared portal axle with the attachment plate and motor inside the frame rails and how the electronics relate to the placement of the motor.

As shown in FIG. 12, an electric portal wheel hub system 607 has the connecting axle 206 coupled with the electric portal hub 207 at the end of the connecting axle and an electric motor 205 attached to a metal flange backing 242 and a half shaft axle 240 is attaching the electric motor 205 to the electric portal hub 207. The wheels shown 204 are configured to turn the electric portal hub 207 and through kinetic energy will turn the electric motor 205 to enable the electric motor to act as a generator for producing power that can be stored in the battery or used to power components of the tractor-trailer 602. The generated power goes to through the motor controller 208 and may be inverted, and then is transferred to a power distribution unit 209. The power distribution unit has a plurality of electric switches to deliver the generated power to a battery, trailer battery, tractor battery or both, or to another electric motor that is part of an electric portal hub, or to auxiliary power components, such as electrical components within the tractor and/or trailer. and then is either sent to the hub battery 210 or sent to the battery system through the wires 219 that may be inside the frame 236 of the trailer. Also shown are the main parts of the electric system starting with the power distribution unit 209 the hub battery 210 and the electronic control unit 214 (ECU), the CAN 215 for communications, sensor box 216 and for charging and DC/DC charging converter 233. Also shown are struts 229 for structure and integrity within the frame.

FIG. 13 shows how an exemplary air ride system 700 operates using a sliding axle system 237. From the frame 236 on the trailer, the slider carriage frame 238 has a trailing arm bracket 310 and trailing arm 202 that is attached to the connecting axle 206 and has air bags 203 of an air bag suspension and a shock absorber 246. There is a bump stop 248 that keeps the trailing arm 202 from crashing into the slider carriage frame 238 or frame 236 of the trailer. The electric motor 205 is coupled to the back metal flange 242 and slides with the slider carriage frame to provide power or receive power from the wheels.

FIG. 14 shows how an exemplary load spring system 702 operates using a sliding axle system 237. From the frame 236 on the trailer, the slider carriage frame 238 has a trailing arm bracket 310, a trailing arm 202 coupled to and extending between the trailing arm bracket and axle 206, load springs 300 and a shock absorber 246. There is a bump stop 248 that keeps the trailing arm 202 from crashing into the slider carriage frame 238 or frame 236 of the trailer. The electric motor 205 is coupled to the back metal flange 242.

For ease of clarity, the electric portal hub system shown in FIGS. 9 to 12 may not specifically show the components as shown in FIGS. 5 to 7 but these components may all be included. The scale of FIGS. 9 to 12 does not allow showing all of the components as shown in FIGS. 5 to 7.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A vehicle comprising:
   a) two wheels;
   b) a hub battery that is a rechargeable battery;
   c) an electronic control unit;
   d) an electrical portal wheel hub system comprising:
      i) an electrical portal hub coupled to each of said two wheels and each electrical portal hub comprising:
         a hub casing;
         an electric motor having a rotational axis;
         an input gear coupled with the electric motor and driven by said electric motor;
      wherein the input gear is coupled with the electric motor and a wheel of said two wheels and provides torque to drive said wheel;
      an output gear that is coupled with the input gear and wherein the output gear drives said wheel;
      a drive axle coupled with said electric motor;
      wherein the rotational axis of the electric motor is vertically offset a vertical offset distance from a rotational axis of said wheel;
      wherein the drive axle has a rotational axis that is vertically offset a vertical offset distance above the rotational axis of said wheel;
      wherein the electric motor is powered by said battery;
      wherein the input gear is driven by the electric motor; and
      wherein the electric motors provide electrical power to the hub battery to charge said hub battery, whereby the electric motors act as a generator.

2. The vehicle of claim 1, wherein the first wheel is on a first side of said vehicle and the second wheel is on a second side of said vehicle.

3. The vehicle of claim 1, wherein the electrical portal wheel hub system further comprises a power distribution unit that controls power from said battery to each of said electric motors.

4. The vehicle of claim 1, wherein the electrical portal wheel hub system further comprises a power distribution unit comprising a plurality of electrical switches and coupled with the each of the electric motors to provide power or receive power from the electric motors.

5. The vehicle of claim 1, wherein the electrical portal wheel hub system further comprises a power distribution unit comprising a plurality of electrical switches and coupled with the hub battery and the electronic control unit, wherein the electronic control unit provides instructions to the power distribution unit for distribution of power from the hub battery and to the electric motors.

6. The vehicle of claim 5, further comprising a CAN Bus that is coupled with the electronic control unit and provides low voltage communication to the electronic control unit.

7. The vehicle of claim 6, wherein the vehicle further comprises a vehicle battery, and wherein the electronic control unit provides instructions through said CAN Bus to the power distribution unit for distribution of power from the hub battery to said vehicle battery.

8. The vehicle of claim 7, where the power distribution unit is configured to distribute power to at least one of the hub battery and the vehicle battery.

9. The vehicle of claim 5, wherein the vehicle further comprises a secondary electrical device and wherein the electronic control unit provides instructions to the power distribution unit for distribution of power from the hub battery to said secondary electrical device.

10. The vehicle of claim 5, wherein the vehicle is a tractor-trailer having a tractor detachably attachable to a trailer and wherein the hub battery provides power to the tractor.

11. The vehicle of claim 5, wherein the vehicle is a tractor-trailer having a tractor detachably attachable to a trailer and a refrigeration unit and wherein the portal hub battery provides power to said refrigeration unit.

12. The vehicle of claim 1, wherein the vehicle comprises a connecting axle and wherein at least one of the two wheels is coupled with the connecting axle.

13. The vehicle of claim 1, wherein the vehicle comprises a connecting axle and wherein the two wheels are coupled with the connecting axle on opposing ends of said connecting axle.

14. The vehicle of claim 13, wherein the vehicle further comprises:
   a) a trailing arm;
   b) a slider axle carriage configured to move with respect to the vehicle;
   c) a shock absorber extending between the trailing arm and a frame of said vehicle; and
   wherein the trailing arm is coupled to a slider axle carriage, and wherein the connecting axle is coupled to the trailing arm and the electric motor is coupled with the slider axle carriage.

15. The vehicle of claim 14, wherein vehicle further comprising an air bag suspension between the trailing arm and the vehicle.

16. The vehicle of claim 14, wherein vehicle further comprising a load spring configured between the trailing arm and the vehicle.

17. The vehicle of claim 1, wherein the electric motor provides a braking torque to said wheel when the electric motor acts as a generator.

18. The vehicle of claim 1, wherein the electric motor is a Permanent Magnet (PM) Synchronous topology motor.

19. The vehicle of claim 1, where the electronic control unit is configured to drive a first wheel of the two wheels at a different speed than a second wheel of said two wheels.

20. The vehicle of claim 6, wherein the vehicle further comprises a secondary electrical device and wherein the electrical portal wheel hub system further comprises a DC/DC converted and wherein the secondary electrical device is a low voltage electrical device requiring a voltage input of 50V or less.

* * * * *